United States Patent Office
3,442,925
Patented May 6, 1969

3,442,925
PROCESS FOR THE PRODUCTION OF
HYDROXYMETHYLSILOXANES
Walter Simmler, Odenthal-Schlinghofen, Hans Niederprum, Monheim, and Hans Sattlegger, Cologne-Buchheim, Germany, assignors to Farbenfabriken Bayer Aktiengesellschaft, Leverkusen, Germany, a corporation of Germany
No Drawing. Filed July 1, 1966, Ser. No. 562,970
Int. Cl. C07f 7/18, 7/02, 7/08
U.S. Cl. 260—448.2
7 Claims

ABSTRACT OF THE DISCLOSURE

Siloxanes of the formula $$HO-CH_2-Si(CH_3)_mO_{\frac{3-m}{2}}$$

optionally containing $$R_nSiO_{\frac{4-n}{2}}$$

unit, where $m=1$ or 2, $n=1$ to 3, and R is alkyl or aryl are prepared by heating a silane of the formula $$(CH_3)_mSiR_3''{-}m$$

or an organosiloxane of the formula $$(CH_3)_mSiO_{\frac{3-m}{2}}$$

the siloxane optionally containing $$R_nSiO_{\frac{4-n}{2}}$$

units, where R, m, and n are as above, $R^1$ is H or $CH_3$ and $R''$ is ethoxy, methoxy, or propyloxy, with ethanol or methanol and a catalytic amount of aromatic sulphonic acid at a temperature less than 100° C.

This invention relates to the production of organosiloxanes which contain at least one structural unit of the formula $$HO-CH_2-Si(CH_3)_m-O_{\frac{3-m}{2}}$$

in which m is 1 or 2, and optionally contain further structural units of the formula $$R_nSiO_{\frac{4-n}{2}}$$

in which n is 1, 2 or 3, and each substituent R is an alkyl, e.g. methyl, or an aryl, e.g. phenyl, radical. These silicon compounds are known to be valuable intermediates for the preparation of esters, urethanes, acetals and polyethersiloxanes and also for the modification of synthetic resins, such as polyesters and polyurethanes.

Organosiloxanes of this type may be obtained, according to a process known from British patent specification No. 980,778, by hydrolyzing bromomethyl-substituted organosiloxanes by means of an alcoholic alkaline solution at room temperature. However, this reaction remains incomplete even after a reaction time of several days; in addition, splitting occurs of the Si—O—Si bond and, in particular, of the Si—C bond which is sensitive to nucleophilic attack, with the formation of methanol and siloxane condensation. The products therefore deviate from the uniform and specific structure which is desired for their intended application.

A process is also known, from U.S. patent specification No. 2,527,591, for the production of 1,3-di-(hydroxymethyl)-tetramethyl-disiloxane and its copolymers with methyl-polysiloxanes, in which 1,3-di-(acetoxymethyl)-tetramethyl-disiloxane is transesterified with a very great excess of methanol and with a slight admixture of hydrochloric acid, copolymerisation being optionally carried out at the same time. This reaction also does not proceed to completion with a very small amount of HCl and at a low temperature; on the other hand, an elevated temperature leads to splitting of the Si—CH$_2$ bond, while a higher concentration of HCl leads to the formation of $$Si-CH_2-Cl$$

in addition to the Si—CH$_2$—OH which is exclusively desired, so that in either case a substantial part (up to more than half) of the theoretical number of hydroxyl groups is missing in the product. The disadvantage mentioned above is thus even more pronounced in this case. Furthermore, it cannot be obviated by replacing the hydrochloric acid with sulphuric acid; this leads to etherification on the hydroxymethyl groups.

It has now been found that it is possible to avoid the esterification of the $$\mathrm{\underset{/}{\overset{\backslash}{-}Si-CH_2-OH}}$$

groups to form $$\mathrm{\underset{/}{\overset{\backslash}{-}Si-CH_2-Cl}}$$

groups, as happens when hydrochloric acid is used, and also the etherification of these groups with one another, as happens when sulphuric acid is used, by using an aromatic sulphonic acid as the catalyst, instead of the aforesaid acids.

According to the present invention, therefore, a process for the production of a hydroxymethyl-substituted organosiloxane having the structure set out above comprises heating an acyloxymethyl-silicon compound which is either a silane derivative of the formula $$(CH_3)_mSiR''_{3-m}$$
$$|$$
$$\underset{\underset{O}{\|}}{CH_2-O-C-R'}$$

in which R' is H or CH$_3$ and R'' is —OCH$_3$, —OC$_2$H$_5$, OC$_3$H$_7$ or $$-O-\underset{\underset{O}{\|}}{C}-R'$$

or an organosiloxane which contains at least one structural unit of the formula $$(CH_3)_mSiO_{\frac{3-m}{2}}$$
$$|$$
$$\underset{\underset{O}{\|}}{CH_2-O-C-R'}$$

(having $O_{1/2}$ instead of R'') and optionally contains further structural units of the formula $$R_nSiO_{\frac{4-n}{2}}$$

with 5 to 20 mols methanol or ethanol per mol R' and a catalytic amount of an aromatic sulphonic acid, at a temperature below 100° C. while simultaneously distilling off the resultant esters of the formulae R'C(O)OCH$_3$ or R'C(O)OC$_2$H$_5$ and adding during the reaction the amount of water stoichiometrically calculated for complete hydrolysis and siloxane condensation, if any amount results, neutralizing the aromatic sulphonic acid with an excess of alcoholic alkaline solution, filtering off the salt thus precipitated, freeing the filtrate from volatile components, and clarifying the remaining product by further filtration.

Suitable aromatic sulphonic acids to be used as catalysts in the process of this invention include benzene-sulphonic acid, p-chlorobenzene-sulphonic acid, and p-toluene-sulphonic acid. Alcoholic potassium hydroxide solution is the preferred alcoholic alkaline solution for neutralizing the catalyst at the end of the reaction, and after filtration of the precipitate formed by this neutralization the filtrate is preferably freed from volatile components, i.e. solvents, at a temperature of 20–30° C. by evaporation under reduced pressure in a current of carbon dioxide.

Compared with sulphuric acid, the aromatic sulphonic acids used according to the invention have the unexpected effect that they catalyze the transesterification of the acyl radicals at a moderately elevated temperature, but catalyze the etherification of the

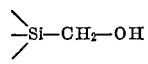

groups with one another only above 80° C. To obtain good yields and pure products it is therefore advantageous to select the acyl radicals and the alcohol used for their transesterification such that the resultant ester does not boil substantially above 80° C., that is to say that the temperature of the reaction mixture can remain below 100° C. The combination where R′ is methyl and the alcohol is methanol has proved to be most satisfactory.

In order to complete the reaction with siloxane condensation, it is necessary to add water to the mixture insofar as the substituents R″ are alkoxyl radicals which are not matched by an equivalent amount of Si-bound acyl radicals each of which produces ½ mol $H_2O$ during the transesterification. This may be illustrated by the following reaction equations, taking the production of 1,3-di-(hydroxymethyl)-tetramethyl-disiloxane ($m=2$) as an example:

(a) $R''=O_{1/2}$;

R′—C(O)—O—CH$_2$—Si(CH$_3$)$_2$—O—Si(CH$_3$)$_2$—CH$_2$—
O—C(O)—R′+2HOCH$_3$→HO—CH$_2$—Si(CH$_3$)$_2$—
O—Si(CH$_3$)$_2$—CH$_2$—OH+2R′—C(O)—OCH$_3$ (b) R″=—O—C(O)—R′;

2R′—C(O)—O—CH$_2$—Si(CH$_3$)$_2$—O—C(O)—
R′+4HOCH$_3$→HO—CH$_2$—Si(CH$_3$)$_2$—O—Si(CH$_3$)$_2$—
CH$_2$—OH+4R′—C(O)—OCH$_3$+H$_2$O (c) R″=—OC$_2$H$_5$;

2R′—C(O)—O—CH$_2$—Si(CH$_3$)$_2$—
OC$_2$H$_5$+2HOCH$_3$+H$_2$O→HO—CH$_2$—Si(CH$_3$)$_2$—O—
Si(CH$_3$)$_2$—CH$_2$—OH+2R′—C(O)—OCH$_3$+2HOC$_2$H$_5$ (d) R″=—O—C(O)—R′ and —OC$_2$H$_5$;

R′—C(O)—O—CH$_2$—Si(CH$_3$)$_2$—O—C(O)—R′
+R′—C(O)—O—CH$_2$—Si(CH$_3$)$_2$—OC$_2$H$_5$
+3HOCH$_3$→HO—CH$_2$—Si(CH$_3$)$_2$—O—
Si(CH$_3$)$_2$—CH$_2$—OH+2R′—C(O)—OCH$_3$+HOC$_2$H$_5$

Equation (d) shows that by using an acyloxysilane derivative according to (b) and an alkoxy-silane derivative according to (c), it is possible to combine in the mixture a reaction according to Equation (b), in which water is formed, and a reaction according to Equation (c), in which water is required, the addition of water thus becoming unnecessary.

The process according to the invention allows of a number of variations in that the cohydrolysis and cocondensation according to Equations (c) and (d) can also be carried out with silanes and siloxanes which contain no carbofunctional substituents, said silanes having the formula $R_{4-m}Si(OH)_m$ or $R_{4-m}Si(OR''')_m$, said siloxanes consisting of structural units of the formula $R_2Si(OH)O_{1/2}$ or $R_2Si'(OR''')O_{1/2}$ exclusively or linked with structural of the formula $$R_nSiO_{\frac{4-n}{2}}$$

in which formula $m$, $n$ and R have the same meaning as above, and R‴ is CH$_3$, C$_2$H$_5$ or C$_3$H$_7$. In this case, the amount of additional water which may be required for the hydrolysis of the compounds containing the SiOR‴ groups in accordance with the reaction equation of the total mixture, has to be added as described above for R″=alkoxyl. Also in this case, no side reactions or delayed reactions are observed. Some of the possible combinations described above may be illustrated by the following reaction equations, taking the production of linear co-condensates as an example ($p$ denotes a positive integer):

(e) R″=—OC$_2$H$_5$, R=phenyl;

2R′—C(O)—O—CH$_2$—Si(CH$_3$)$_2$—OC$_2$H$_5$
+(C$_6$H$_5$)$_2$Si(OH)$_2$+2HOCH$_3$→HO—CH$_2$—
Si(CH$_3$)$_2$—O—Si(C$_6$H$_5$)$_2$—O—Si(CH$_3$)$_2$—
CH$_2$OH+2R′—C(O)—OCH$_3$+2HOC$_2$H$_5$ (f) R″=—OC$_2$H$_5$, R=CH$_3$;

2R′—C(O)—O—CH$_2$—Si(CH$_3$)$_2$—OC$_2$H$_5$
+HO[Si(CH$_3$)$_2$—O]$_p$H+2HOCH$_3$→HO—
CH$_2$[Si(CH$_3$)$_2$—O]$_{1+p}$—Si(CH$_3$)$_2$—CH$_2$—OH
+2R′—C(O)—OCH$_3$+2HOC$_2$H$_5$ (g) R″=—O—C(O)—R′, R=CH$_3$, R‴=C$_2$H$_5$;

2R′—C(O)—O—CH$_2$—Si(CH$_3$)$_2$—O—C(O)—R′
+(CH$_3$)$_2$Si(OC$_2$H$_5$)$_2$+4HOCH$_3$→HO—
CH$_2$[Si(CH$_3$)$_2$—O]$_2$—Si(CH$_3$)$_2$—CH$_2$—
OH+4R′—C(O)—OCH$_3$+2HOCH$_2$H$_5$ (h) R″=—OC$_2$H$_5$, R=CH$_3$, R‴=C$_2$H$_5$;

2R′—C(O)—O—CH$_2$—Si(CH$_3$)$_2$—OC$_2$H$_5$
+p(CH$_3$)$_2$Si(OC$_2$H$_5$)$_2$+2HOCH$_3$+(1+p)H$_2$O→
HO—CH$_2$[Si(CH$_3$)$_2$—O]$_{1+p}$Si(CH$_3$)$_2$—CH$_2$—OH
+2R′—C(O)—CH$_3$+2(1+p)HOC$_2$H$_5$ (i) R″=—O—C(O)—R′, R=CH$_3$, R‴=C$_2$H$_5$;

2R′—C(O)—O—CH$_2$—Si(CH$_3$)(—O—C(O)—R′)$_2$
+p(CH$_3$)$_2$Si(OC$_2$H$_5$)$_2$+2(CH$_3$)$_3$SiOC$_2$H$_5$
+6HOCH$_3$+(p—1)H$_2$O→(CH$_3$)$_3$Si—O—
{[—Si(CH$_3$)(CH$_2$OH)—O—]$_2$[—Si(CH$_3$)$_2$—O—]$_p$}—
Si(CH$_3$)$_3$+6R′—C(O)—OCH$_3$+2(1+p)HOC$_2$H$_5$

By means of such variants of the process it is now possible to produce organopolysiloxanes with lateral hydroxymethyl groups, which were previously unknown, as well as organopolysiloxanes with a predetermined content of terminal hydroxymethyl groups, which cannot be reliably obtained by the method hitherto applied, i.e. an equilibration reaction of 1,3 - di - (hydroxymethyl)-tetramethyl-disiloxane with purely hydrocarbon-substituted siloxanes.

The following examples are given for the purpose of illustrating the invention.

Example 1

CH$_3$—C(O)—O—CH$_2$—Si(CH$_3$)$_2$—
O—Si(CH$_3$)$_2$—CH$_2$—O—C(O)—CH$_3$
+2HOCH$_3$→HO—CH$_2$—Si(CH$_3$)$_2$—O—
Si(CH$_3$)$_2$—CH$_2$—OH+2CH$_3$—C(O)—OCH$_3$ 278 grams (1 mol) 1,3-di-(acetoxymethyl)-tetramethyl-disiloxane and 6.2 g. of benzene-sulphonic acid are dissolved in 640 g. (20 mols) methanol and the acetic acid methyl ester and excess methanol are distilled off from this solution through a column by heating up to 90° C. (70° C. at the head of the column). The residue is mixed with a solution of 2.3 g. potassium hydroxide in 30 cc. methanol, the precipitated salt is filtered off and the residual solvent is evaporated from the filtrate in a current of carbon dioxide which is passed through by heating up to 90° C. under a pressure reduced to 3 mm. Hg. The residue is filtered until clear and as the filtrate there is obtained, in virtually quantitative yield, 1,3-di-(hydroxymethyl)-tetramethyl-disiloxane which, at 20° C., has a density of 0.985 g./cc., a viscosity of 45 cp., a hydroxyl content of 17.0 percent by weight, and a refractive index $n_D^{20}=1.4385$.

The same result is obtained when 7.5 g. p-chlorobenzene-sulphonic acid or 6 g. p-toluene-sulphonic acid are used, instead of the benzene-sulphonic acid, and the process is otherwise carried out as described above.

Example 2

$2CH_3$—C(O)—O—$CH_2$—Si($CH_3$)$_2$—O—

C(O)—$CH_3$+$4HOCH_3$→HO—$CH_2$—Si($CH_3$)$_2$—O—

Si($CH_3$)$_2$—$CH_2$—OH+$4CH_3$—C(O)—$OCH_3$+$H_2O$ 190.3 grams (1 mol) dimethyl-(acetoxymethyl)-acetoxysilane and 5.7 g. p-toluene-sulphonic acid are dissolved in 320 g. (10 mol) methanol and this solution is further treated as described in Example 1. The same product as in Example 1 is finally obtained, having a refractive index $n_D^{20}=1.4388$.

Example 3

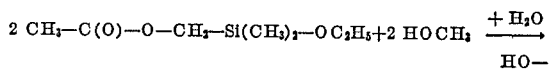

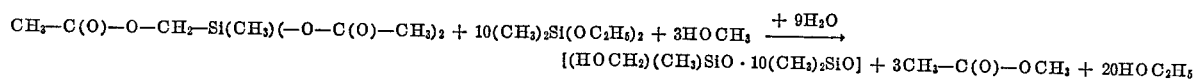

1 mol dimethyl-(acetoxymethyl)-ethoxysilane and 5.7 g. p-toluene-sulphonic acid are dissolved in 10 mols methanol, the solution is distilled as described in Example 1, and a mixture of 10 cc. water and 100 cc. methanol is gradually added during the distillation. The residue after distillation is treated as in Example 1 and infrared-spectroscopically pure 1,3 - di - (hydroxymethyl)-tetramethyl-disiloxane is finally obtained with a content of 17.1 percent by weight OH and a refractive index $n_D^{20}=1.4389$.

Example 4

$CH_3$—C(O)—O—$CH_2$—Si($CH_3$)$_2$—O—

C(O)—$CH_3$+$CH_3$—C(O)—O—$CH_2$—

Si($CH_3$)$_2$—$OC_2H_5$+$3HOCH_3$→HO—$CH_2$—

Si($CH_3$)$_2$—O—Si($CH_3$)$_2$—$CH_2$—OH

+$3CH_3$—C(O)—$OCH_3$+$HOC_2H_5$ 0.5 mol dimethyl-(acetoxymethyl)-acetoxysilane, 0.5 mol dimethyl-(acetoxymethyl)-ethoxysilane and 5.7 g. p-toluene-sulphonic acid are dissolved in 10 mols methanol and this solution is further treated as described in Example 1. The final product contains 16.9 percent by weight OH, and has a refractive index $n_D^{20}=1.4392$.

Example 5

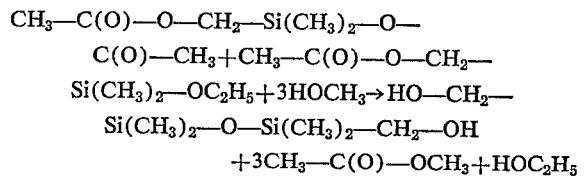

46.8 grams (0.2 mol) methyl-(acetoxymethyl)-diacetoxysilane, 296 g. (2 mols) dimethyl-diethoxysilane and 2 g. p-toluene-sulphonic acid are dissolved in 300 cc. methanol, the solution is distilled as described in Example 1, and a mixture of 32.4 g. (1.8 mols) water and 100 cc. methanol is gradually added during the distillation. The residue after distillation is treated as described in Example 1 and a substantially linear methyl-polysiloxane which is hydroxymethyl-substituted in lateral position is finally obtained in the form of a viscous oil with an OH content of 1.7 percent by weight (calculated 2.0); this compound consists of siloxane units of the formula

and ten times their number of dimethyl-siloxane units.

What we claim is:

1. Process for the production of an organosiloxane which contains at least one structural unit of the formula

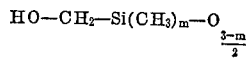

in which $m$ is 1 or 2, each of the remaining structural units having the formula

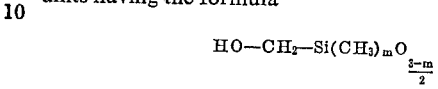

or the formula

in which $n$ is 1, 2 or 3 and each of the substituents R is an alkyl or aryl radical, which comprises heating an acyloxymethyl-silicon compound selected from the group consisting of a silane derivative having the formula

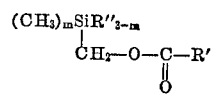

and an organosiloxane which contains at least one structural unit of the formula

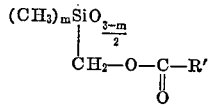

each of the remaining structural units having the formula

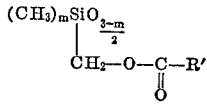

or the formula

in which formulae R' is H or $CH_3$ and R'' is —$OCH_3$, —$OC_2H_5$, —$OC_3H_7$ or

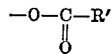

the meaning of R, $m$ and $n$ being as defined above, with 5 to 20 mols methanol or ethanol per mol R' and a catalytic amount of an aromatic sulphonic acid, at a temperature below 100° C., while simultaneously distilling off the resultant ester of the formula

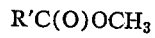

or

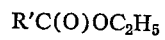

and adding during the reaction the amount of water stoichiometrically calculated for complete hydrolysis and siloxane condensation, if any amount results, neutralizing the aromatic sulphonic acid with an excess of an alcoholic alkaline solution, filtering off the salt thus precipitated, freeing the filtrate from volatile components, and clarifying the remaining product by further filtration.

2. Process as claimed in claim 1 wherein each substituent R is a methyl or phenyl radical.

3. Process as claimed in claim 1 wherein the alcoholic alkaline solution is an alcoholic potassium hydroxide solution.

4. Process as claimed in claim 1 wherein the sulphonic acid is benzene-sulphonic acid, p-chlorobenzene-sulphonic acid, or p-toluene-sulphonic acid.

5. Process as claimed in claim 1 wherein the volatile components of the filtrate are removed by evaporation under reduced pressure in a current of carbon dioxide at a temperature of 20–30° C.

6. Process as claimed in claim 1 wherein the said acyloxymethylsilicon compound is a silane derivative of the said formula and said heating is carried out in the presence of a condensable organo-silicon compound which is a silane of the formula $R_{4-m}Si(OH)_m$ or a siloxane consisting of structural units of the formula $R_2Si(OH)O_{1/2}$ exclusively or of structural units of the formulae $$R_2Si(OH)O_{1/2}$$

and

7. Process as claimed in claim 1 wherein the said acyloxymethylsilicon compound is a silane derivative of the said formula and said heating is carried out in the presenc of a hydrolyzable organo-silicon compound which is a silane of the formula $R_{4-m}Si(OR''')_m$ wherein $R'''$ is $CH_3$, $C_2H_5$ or $C_3H_7$, or a siloxane consisting of structural units of the formula $R_2Si(OR''')O_{1/2}$ exclusively or of structural units of the formulae $R_2Si(OR''')O_{1/2}$ and

and wherein the amount of water stoichiometrically calculated for complete hydrolysis and siloxane condensation is added during the said heating.

References Cited

UNITED STATES PATENTS

| | | |
|---|---|---|
| 2,527,591 | 10/1950 | Speier. |
| 3,294,725 | 12/1966 | Findlay et al. ____ 260—448.2 X |
| 3,317,460 | 5/1967 | Clark et al. _____ 260—448.2 X |
| 3,324,161 | 6/1967 | Simmler. |

FOREIGN PATENTS 769,497   3/1957   Great Britain.

TOBIAS E. LEVOW, *Primary Examiner.*

P. F. SHAVER, *Assistant Examiner.*